3,079,360
PROCESS FOR MULTI-STEP COAGULATION OF RUBBER LATICES
John D. Sutherland, Jr., and Robert A. Gerlicher, Baton Rouge, La., assignors to Copolymer Rubber and Chemical Corporation, a corporation of Louisiana
Filed Dec. 30, 1958, Ser. No. 783,920
20 Claims. (Cl. 260—33.6)

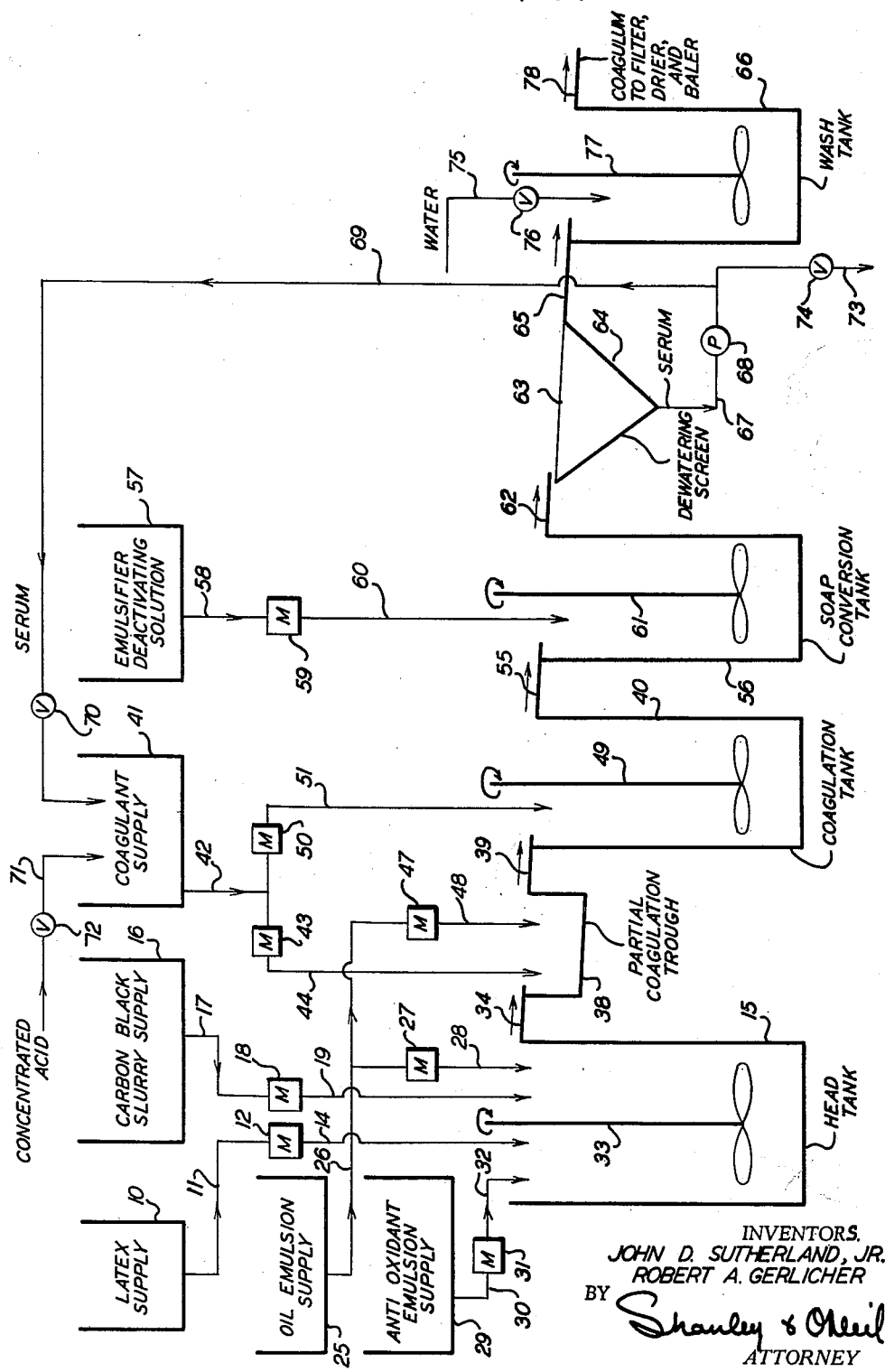

This invention relates to the coagulation of rubbery polymer latices and, in some of its more specific aspects, the invention further relates to a novel method of coagulating rubbery polymer latices whereby the crumb size of the resulting coagulum may be increased over that obtainable by prior art coagulation processes. The invention also relates to the rubbery polymer product prepared by the method of the invention.

It has long been known that incorporation of colloidal carbons generally referred to in the art as carbon black with rubbery polymers imparts desirable properties in the ultimate product such as increased modulus, tensile strength and abrasion resistance. While carbon black is widely used as a reinforcing agent for rubbery polymers and it is very satisfactory for this purpose once properly incorporated therewith, the prior art methods available heretofore for incorporating carbon black with rubbery polymers have left much to be desired.

The method most widely used at present for incorporating carbon black with rubbery polymers involves vigorous milling of dry pelletized carbon black into a solid rubbery polymer to be reinforced therewith over an extended period of time. The labor and power requirements for milling dry pelletized carbon black into solid rubbery polymers are excessive and also it is often difficult to obtain a uniform dispersion of sufficiently finely divided particles of carbon black. This tends to deleteriously affect the ultimate product since, for best results, it is essential that the carbon black be uniformly dispersed in finely divided form throughout the solid rubbery polymer. In addition, the working conditions are very undesirable since the light, dry particles of carbon black are extremely difficult to restrict to the working area and invariably the milling equipment and even the entire plant in the vicinity of the milling operation are soon covered with a sooty layer of carbon black.

As a result of the above-mentioned and other disadvantages of the prior art methods of milling dry carbon black into solid rubbery polymers, still other methods have been proposed for incorporating carbon black in rubbery polymers. One such method includes mixing an aqueous suspension of carbon black with rubbery polymers which are in the form of latex, and then coagulating the mixture of latex and aqueous suspension of carbon black to produce coagulum of the rubbery polymer having carbon black dispersed therein in finely divided form. This method, i.e., black masterbatching or oil-black masterbatching, requires that the carbon black be added to the latex in the form of an aqueous slurry with the carbon black being in an extremely finely divided condition. Since the aqueous slurry of wetted carbon black is easily handled and readily restricted to the working area and, upon coagulation of the mixture, the resulting coagulum already contains finely divided carbon black dispersed therein, the carbon black handling problem and extensive milling requirement characteristic of methods for incorporating dry pelletized carbon black with solid rubbery polymer are eliminated. However, when a mixture of latex and carbon black slurry, i.e., a carbex is coagulated by prior art practice to produce the desired rubbery polymer black masterbatch or oil-black masterbatch, the crumb size is extremely small with a prohibitive amount of fines being produced. Efforts to increase the crumb size, up until the time of the present invention, have not provided a method for the continuous coagulation of a carbex which is economic and generally acceptable to the industry.

A large crumb size is very desirable in the physical processing of rubbery polymer coagulum since small crumb size material passes through filter screens employed for separating serum or wash water from coagulum and is lost in the plant effluent. Also, during drying of the crumb by means of conventional drier flights including perforated metal trays, a large proportion of the smaller particles and fines sift through the perforated trays and are lost in the drier. This allows fine particles of rubbery polymer to come into contact with the drier heating means and the rubbery polymer may be ignited and cause very serious drier fires which result in loss of product and extensive damage to equipment. Thus, it is essential that fines be removed from the drier at frequent intervals when processing fine crumb material and placed back in the drier trays by manual labor. This is a time consuming and expensive operation. As a result of the foregoing disadvantages, the art has long sought a satisfactory method for producing black masterbatches or oil-black masterbatches characterized by an increased crumb size that may be conveniently handled in presently used equipment.

While not limited thereto, the most difficulty with fines or undersized coagulum is experienced in the coagulation of latices containing dispersed pigment or reinforcing material. For example, in the coagulation of a carbex, i.e., a mixture of carbon black slurry and latex, to produce a rubbery polymer product containing carbon black dispersed therein, it is almost impossible by conventional methods of coagulation to prevent the formation of an uneconomic proportion of fines. While this problem has been long recognized in the coagulation of black masterbatches and oil-black masterbatches, as well as other pigment or reinforcing agent-masterbatches, a method has not been available heretofore that is satisfactory from the commercial standpoint and yet is capable of substantially reducing formation of fines and undersized particles of coagulum.

In accordance with one important embodiment of the present invention, it has been discovered that the crumb size of rubbery polymer coagulum may be increased by partially coagulating rubbery polymer latex, dispersing a suitable tackifying agent in the partially coagulated latex, and then further coagulating the latex in the presence of the dispersed tackifying agent. The method of the invention, regardless of the specific rubbery polymer latex employed or the presence or absence of pigments or reinforcing agents, will result in an increase in the crumb size of the resulting coagulum. Thus, the principles of the present invention may be applied in any coagulation process where it is desired to increase the particle size of rubbery polymer coagulum.

It is an object of the present invention to provide a novel method of coagulating rubbery polymer latices whereby the size of the resultant particles of rubbery polymer coagulum may be increased.

It is a further object of the present invention to provide a novel solid rubbery polymer product prepared by the method of the invention which is characterized by an increased crumb size over that obtainable by satisfactory prior art methods.

It is still a further object of the present invention to provide a novel method of coagulating a carbex whereby the size of the resultant particles of rubbery polymer coagulum may be increased.

It is still a further object of the present invention to provide a novel solid rubbery polymer product containing dispersed carbon black prepared by the method of the invention which is characterized by an increased crumb size over that obtainable by satisfactory prior art methods.

It is still a further object of the present invention to provide a novel method of preparing oil-black masterbatches by further coagulation of a partially coagulated carbex in the presence of a tackifying agent whereby the size of the resultant crumb may be increased.

It is still a further object of the present invention to provide a novel method of coagulating rubbery polymer latices containing dispersed therein a pigment and/or reinforcing agent by further coagulation of the partially coagulated latex in the presence of oil emulsion whereby the size of the resultant crumb may be increased over that obtainable by satisfactory prior art coagulation processes.

It is still a further object of the present invention to provide a pigmented and/or reinforced rubbery polymer product prepared by the method of the invention and characterized by increased crumb size over that obtainable by satisfactory prior art coagulation processes.

Still other objects of the present invention and the attendant advantages will be apparent to those skilled in the art upon reference to the following detailed description and the drawing, which illustrates a presently preferred arrangement of apparatus for practicing the present invention.

Referring now to the drawing, rubbery polymer latex contained in latex supply tank 10 may be withdrawn via conduit 11 and passed at a predetermined rate controlled by meter 12 via conduit 14 to head tank 15. Carbon black slurry contained in tank 16 may be withdrawn via conduit 17 and passed at a predetermined rate controlled by meter 18 via conduit 19 to head tank 15. In addition, rubbery polymer processing oil emulsion contained in tank 25 may be withdrawn via conduit 26 and passed at a predetermined rate controlled by meter 27 via conduit 28 to head tank 15; while antioxidant emulsion contained in tank 29 may be withdrawn via conduit 30 and passed at a predetermined rate controlled by meter 31 via conduit 32 to head tank 15. The various ingredients fed to head tank 15 may be agitated and thoroughly mixed by agitation means including driven stirrer 33 and may overflow via spout 34 in the form of a more or less homogeneous aqueous mixture. In the event it is not desired to prepare an oil-extended rubbery polymer product having a high oil content, the oil emulsion feed to head tank 15 may be eliminated as well as the anti-oxidant emulsion where it is not desired.

The carbex passes from spout 34 into partial coagulation trough 38 and, after passing therethrough, overflows via spout 39 into coagulation tank 40. A suitable prior art coagulant contained in coagulant supply tank 41 may be fed via conduits 42 and 44 at a predetermined rate controlled by meter 43 into a portion of the partial coagulation trough 38 near the carbex entry side, i.e., near spout 34. The rate of feed of the coagulant is such as to partially coagulate the latex and assure the formation of small particles of coagulum which may be approximately the size of grains of sand. However, somewhat smaller and much larger particles of coagulum may be formed at this point. The amount of coagulum formed will depend somewhat upon the amount of coagulant introduced at this point. Satisfactory results have been obtained by coagulating either a major or minor proportion of the latex, and preferably about 5–80% by weight of the rubbery polymer content of the latex should be coagulated at this point. For best results, usually about 20–40% by weight of the rubbery polymer should be coagulated during the partial coagulation step.

The preferred coagulant for most rubbery polymer latices is dilute mineral acid having a pH of about 1.0–2.5 and preferably about 1.7. While any suitable mineral acid such as sulfuric acid, hydrochloric acid, phosphoric acid, etc., may be used, usually dilute sulfuric acid is the preferred mineral acid. However, as will be recognized by those skilled in the art, any suitable prior art coagulant including organic acids such as acetice acid or salts such as alum may be used at this point to partially coagulate the latex and produce particles of coagulum having a size about that of grains of sand or larger. The coagulant may be carbonic acid in some instances and, in such event, preferably carbon dioxide is added directly to the latex under super-atmospheric pressure and at elevated temperature to assure faster partial coagulation. The desired degree of partial coagulation may be controlled by visual observation or by controlling the pH of the latex-containing mixture overflowing spout 39. For example, when coagulating a carbex, the coagulant may be added in sufficient quantity to form particles of coagulum in the mixture overflowing spout 39, with the mixture having the appearanc of black grains of sand floating in a grayish serum containing a considerable amount of latex. In the event the partial coagulation in trough 38 is controlled by pH, then a pH of about 4.0–6.5 is usually satisfactory in most instances. However, for best results usually a pH of about 5.0–5.5 is preferred.

In accordance with one important feature of the present invention, rubbery polymer processing oil is added to the partially coagulated latex and preferably to the partial coagulation trough 38 at a point between the coagulant feed and the overflow spout 39. Preferably, the coagulant is added to the trough 38 at a point almost immediately after entry of the carbex, while the oil emulsion may be fed via conduit 48 at a predetermined rate controlled by meter 47 to a point approximately midway or somewhat past midway of the trough 38. It is not always essential that oil be supplied to the head tank, but it is essential that oil be dispersed in the partially coagulated latex to be further coagulated.

The partially coagulated latex overflowing spout 39 may be agitated in coagulation tank 40 by agitation means including driven stirrer 49. Additional coagulant contained in coagulant supply tank 41 may be withdrawn via conduit 42 at a predetermined rate controlled by meter 50 and fed to coagulation tank 40 via conduit 51. This coagulant may be dilute mineral acid as described above, concentrated mineral acid, or other suitable coagulant or combination of coagulants may be used if desired. For example, carbonic acid often may be used as the coagulant in partial coagulation trough 38 followed by dilute mineral acid in coagulation tank 40. In most instances, the preferred coagulant for addition to coagulation tank 40 is dilute mineral acid of a strength as described above for addition to trough 38, and it should be added in sufficient quantity to assur substantially complete coagulation of the latex. Usually, the contents of coagulation tank 40 should be maintained at a pH of about 1.7–5.0, and for preferred results at a pH of about 3.0. When the coagulant is added in this amount, the serum overflowing spout 55 is milky white in color but contains very little uncoagulated latex.

The agitated mixture of crumb and serum overflows spout 55 into soap conversion tank 56. A suitable prior art secondary emulsifier deactivating solution such as diethylene triamine contained in supply tank 57 is withdrawn via line 58 at a predetermined rate controlled by meter 59 and fed to soap conversion tank 56 via conduit 60. The contents of soap conversion tank 56 are agitated by agitation means including driven stirrer 61 and thoroughly mixed. While the emulsifier deactivating solution may be diethylene triamine, "polyamine H" solution is preferred for economic reasons. Polyamine H is still bottoms obtained in the preparation of diethylene triamine or various other amine compounds. When the emulsifier deactivating solution is polyamine H solution, it may be added as a 0.1–50% solution in quantities sufficient to clear the serum overflowing spout 62 and thereby cause complete coagulation of the latex.

The mixture of crumb and clear serum overflows spout 62 onto de-watering screen 63 where the serum is separated from the crumb and passed downwardly into vessel 64. The crumb is passed via spout 65 into wash tank 66. Serum is withdrawn from vessel 64 via conduit 67 and transferred by pump 68 via conduit 69 at a rate controlled by valve 70 to coagulant supply tank 41. Since the serum has a pH of at least about 3.0 or higher, sufficient concentrated acid is added to coagulant supply tank 41 via conduit 71 at a rate controlled by valve 72 to lower the pH to a desired level such as 1.7. Any excess serum which is not required for recycle to coagulant supply tank 41 is withdrawn via conduit 73 at a rate controlled by valve 74 and may be discarded.

Water is added to wash tank 66 via conduit 75 at a rate controlled by valve 76 and the mixture of crumb and water agitated by agitation means including driven stirrer 77. Since an acid-free crumb is desired, preferably the coagulation should be effected at a pH not lower than about 3.0 so as to reduce the amount of free acid present in the filtered crumb. It so desired, a small amount of base may be added to the wash water for the purpose of neutralizing the free acid. The mixture of washed crumb and wash water overflows spout 78 and it is then dewatered, dried, and baled in accordance with prior art practice.

The crumb size of rubbery polymer coagulum produced in accordance with the above described process is increased substantially over that obtained by prior art coagulation methods wherein a partial coagulation step, oil addition and further coagulation in the presence of the added oil is not practiced. Thus, in accordance with the present invention, it is possible to increase the crumb size sufficiently to substantially reduce the problems existing heretofore due to undersized crumb and fines.

The carbex continuously overflowing spout 34 may be prepared by adding continuously to head tank 15 1–200 gallons per minute of a conventional 1–10% (by weight) high abrasion furnace black slurry in water, 1–100 gallons per minute of a 5–40% TSC (by weight) rubbery polymer latex such as butadiene-styrene latex prepared by a conventional "cold rubber" polymerization recipe and process, 0–20 gallons per minute of a 20–70% (by weight) conventional rubbery polymer processing oil emulsion, and 0.1–10 pounds per minute of a 5–25% (by weight) conventional rubbery polymer anti-oxidant emulsion such as "BLE" or phenyl-B-naphthylamine. "BLE" is a proprietary product that is said to be the high temperature reaction product of di-phenylamine and acetone. The resulting carbex may contain, for each 100 parts by weight of rubbery polymer, 1–105 parts by weight of carbon black, 0–105 parts by weight of processing oil and 0.5–3.5 parts by weight of anti-oxidant. The preferred composition for most purposes is 50 parts by weight of carbon black, 10 parts by weight of processing oil and 1.25 parts by weight of anti-oxidant for each 100 parts by weight of rubbery polymer.

The oil emulsion may be added to trough 38 in an amount of about 1–105 parts by weight of contained oil for each 100 parts by weight of polymer, with about 1–50 parts by weight of contained oil for each 100 parts by weight of polymer generally being preferred. Usually about 10 parts by weight of contained oil for each 100 parts by weight of polymer will give very good results from the standpoint of producing large crumb-size product. However, in instances where an oil-extended polymer is being prepared, more processing oil may be added to give the desired composition. If it is desired to prepare an oil-extended rubbery polymer product, then a portion of the oil should be fed to head tank 15 for best results and a second portion fed to partial coagulation trough 38. For example, it is usually preferred to feed 1–50 parts by weight of the oil to the head tank and 1–50 parts by weight to the partial coagulation trough for each 100 parts by weight of polymer. Generally, it is only necessary that the quantity of oil fed to the partial coagulation trough 38 be sufficient to coat at least a major proportion of the rubbery polymer particles after breaking of the emulsion. When the coagulant is dilute mineral acid having a pH of about 1.0–2.5, it may be added to trough 38 at the rate of 1–30 gallons per minute and to the coagulation tank 40 at the rate of 10–80 gallons per minute to provide the necessary pH limits.

While a continuous process has been described above, it is understood that the invention is not limited thereto. For example, the principles of the present invention also are applicable to batch-type operation. In addition, it may be possible to prepare masterbatches containing other pigments and/or reinforcing agents for rubbery polymers such as lignin, finely divided calcium silicate, clay, silica, etc. Also, where the coagulant is carbonic acid or alum, it is possible to prepare masterbatches of finely divided zinc oxide, calcium carbonate, magnesium carbonate, etc. The pronounced tendency of such materials to cause an uneconomic proportion of fines when latex containing the same is coagulated in accordance with prior art methods may be substantially reduced when operating in accordance with the present invention. Emulsions of tackifying substances other than rubbery polymer processing oils may be added to partially coagulated latex, the emulsion broken, and the substance deposited on the particles of polymer, as distinguished from being distributed therethrough, in an amount which causes the small particles to tend to fuse and form larger particles during a subsequent further coagulation step. Examples of substances useful as tackifying agents in the form of aqueous emulsions are rosin oil, disproportionated rosin acids, N-wood rosin, liquid low molecular weight polybutadiene, anti-oxidants such as BLE or anti-oxidants such as N,N'-dioctyl paraphenylene diamine, pine tar oil, naphthenic acid, and asphaltic materials such as "mineral rubber." In some instances, the tackifying substance need not be added in emulsion form since the rubbery polymer particles may be coated with the tackifying substance directly.

The addition of rubber processing oil emulsion, or other suitable tackifying agent, to partially coagulated latex containing a pigment and/or reinforcing agent is thought to result in the deposition of a film on the fine particles of coagulum which aids in the agglomeration of the fines into larger particles upon further coagulation of the latex. The resulting larger particles are characterized by a porous structure which dries more satisfactory and at a faster rate without "case hardening" of the crumb. The preparation of an oil-black masterbatch in accordance with the invention also results in a better quality, higher Mooney rubbery polymer product without the disadvantages of reduced processability. In addition, when processing the rubbery polymer product of the invention, it is possible to use shorter Banbury cycles and yet obtain equally good dispersion of both oil and carbon black. Thus, among other advantages the present invention reduces processing equipment requirements, increases the capacity of existing equipment, and decreases labor requirements.

Either natural or synthetic rubber latex may be coagulated in accordance with the invention. The synthetic rubber latices which may be coagulated in accordance with the invention may be prepared by processes well known in the art such as, for example, prior art processes wherein a polymerizable monomeric material or a mixture of polymerizable materials is emulsified in an aqueous medium by means of an emulsifying agent such as a soap or other suitable surface active agent, and the polymerization made to take place at a controlled temperature in the presence of a suitable catalyst and/or other regulating materials. The primary emulsifier preferably should be unstable at low pH and may be a long chain fatty acid soap such as sodium or potassium oleate or stearate, the rosin soaps, or mixtures thereof. The polymerization is generally "short-stopped" at a suitable stage before complete conversion, such as at about 60% conversion, and the unreacted monomer or monomers removed by conventional flashing and/or stripping. As is well understood in the art, it is also advantageous in the preparation of certain synthetic rubber latices, such as SBR latices, to carry out the polymerization at a low temperature such as about 41° F. However, the polymerization may take place at a high temperature such as about 122° F. when preparing SBR latices by a prior art "hot rubber" process.

Examples of polymerizable materials for use in preparing the synthetic rubber latices are the various 1,3-butadienes such as 1,3-butadiene, methyl-2-butadiene-1,3-piperylene, and 2,3-dimethyl-butadiene-1,3. If desired, the polymerizable material may be a mixture of a 1,3-butadiene, such as 1,3-butadiene, with another polymerizable compound which is capable of forming rubbery copolymers with 1,3-butadienes. For example, such polymerizable mixtures may contain up to 50% (or higher in some instances) of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1,3-butadienes are the aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene; methyl vinyl ether; and methyl vinyl ketone. The foregoing polymerizable substances or mixtures are examples of materials that may be used in preparing rubbery polymer latices for use in the present invention which may be referred to in the specification and claims as latices of homo-polymers of conjugated diolefins and copolymers of conjugated diolefins and ethylenically unsaturated monomers. In addition, natural rubber latex and polychloroprene latex may be used. The preferred polymerizable material is a mixture of butadiene and styrene wherein the styrene content of the mixture, by weight, is less than about 50%. A typical recipe in parts by weight for preparing a butadiene-styrene synthetic rubber latex by a "cold rubber" process is given below in Table I.

TABLE I

| | |
|---|---:|
| Butadiene | 100–50 |
| Styrene | 0–50 |
| Primary emulsifier [1] | 1.5–5.0 |
| Electrolyte [2] | 0.2–1.5 |
| Secondary emulsifier [3] | 0–0.12 |
| Ethylenediamine tetraaectic acid tetra sodium salt [4] (in soap solution) | 0–0.10 |
| Sodium hydrosulfite | 0–0.10 |
| Water | 150–250 |
| Sodium formaldehyde sulfoxylate | 0.04–0.20 |
| Diisopropylbenzene hydroperoxide or paramethane hydroperoxide | 0.03–0.30 |
| Tertiarydodecylmercaptan | 0–0.3 |
| Ferrous sulfate heptahydrate | 0.02–0.04 |
| Versene 100 to complex ferrous sulfate | 0.03–0.06 |
| Shortstop [5] | 0.05–0.20 |

[1] The primary emulsifier may be a long chain fatty acid soap such as sodium or potassium oleate or stearate, the rosin soaps, or mixtures thereof.
[2] The following electrolytes or mixtures may be used: Potassium chloride, sodium chloride, trisodium phosphate, tripotassium phosphate, potassium pyrophosphate, potassium sulfate, sodium sulfate, sodium borate and lithium chloride. The preferred electrolyte is 0.3 part by weight of trisodium phosphate.
[3] Tamol N, Daxad 11, Nycol (polymerized sodium salts of alkyl naphthalene sulfonic acid).
[4] Sold as Versene 100, a product of Dow Chemical Company; Sequestrene 30A, a product of Alrose Chemical Company; Nullapon BF–13, a product of Antara Chemicals.
[5] A 50/50 mixture of sodium dimethyl dithiocarbamate and sodium polysulfide.

The preparation of carbon black slurries is well known in the art. For example, pelletized high abrasion furnace black may be finely ground by a mechanical pulverizer such as a Mikro-Pulverizer and the dry carbon black dropped into an aqueous solution of a wetting agent or soap with agitation. The oil emulsion and the anti-oxidant emulsion may be prepared by any suitable process such as by violently agitating the oil or anti-oxidant in a blender with an aqueous solution of a wetting agent or soap. Any suitable rubber processing oil may be used in preparing the oil emulsion. While numerous suitable rubber processing oils are known to the art, several examples are described by Rostler et al., Industrial and Engineering Chemistry, vol. 41, No. 3 (March 1949), pages 598–608; and Weinstock et al., Industrial and Engineering Chemistry, vol. 45, No. 5 (May 1953), pages 1036–1053. Other suitable rubbery polymer processing oils are rubber processing oils of the paraffinic, aromatic, highly aromatic, naphthenic, and highly naphthenic types. These oils are usually of petroleum origin.

The foregoing detailed description and the following specific example is for purposes of illustration only and are not intended as limiting to the spirit or scope of the appended claims.

*Example*

A 6% (by weight) carbon black slurry was pumped to a head tank at a rate of 60 gallons per minute, while a 20% TSC (by weight) butadiene-styrene latex prepared by a conventional "cold rubber" process using the polymerization recipe of Table I was metered into the head tank at a rate of 34.5 gallons per minute. In addition, 3.78 gallons per minute of a 55% (by weight) rubbery polymer processing oil emulsion was metered into the head tank along with 4.8 pounds per minute of a 15% (by weight) BLE emulsion. The resulting contents of the head tank were approximately as follows, with all parts being by weight:

| | Parts |
|---|---:|
| Butadiene-styrene rubbery polymer solids | 100 |
| Carbon black | 50 |
| Processing oil | 30 |
| BLE anti-oxidant | 1.25 |

The above ingredients were fed to the head tank continuously and the resulting carbex continuously overflowed into a partial coagulation trough where recycled serum having a pH of 1.7 (dilute sulfuric acid) was added at the rate of 15 gallons per minute to partially coagulate the latex. The acid was added at a point in the coagulation trough which was immediately adjacent the overflow trough leading from the head tank. Rubber processing oil emulsion was added to the partial coagulation trough at a point approximately half-way between the latex entry and the exit spouts. About 1.26 gallons per minute or about 10 parts by weight of the rubbery polymer processing oil per 100 parts of polymer were added at this point. Thus, the total amount of oil was about 40 parts by weight for each 100 parts by weight of polymer.

Under the above described conditions, the latex was partially coagulated in the partial coagulation trough to yield sand-like particles of rubbery polymer in a grayish colored latex. The resulting partially coagulated latex after addition of the processing oil was fed continuously to a coagulation tank where sufficient additional sulfuric acid solution was added to maintain a pH therein of about 3.0. The contents of the coagulation tank were continuously agitated and the remaining latex was coagulated.

The agitated mixture of polymer crumb and milky serum was overflowed from the coagulation tank into a soap conversion tank where 4 gallons per minute of 1% by weight diethylene triamine solution was added to clear the serum.

A mixture of the resulting crumb and clear serum was overflowed from the soap conversion tank onto a dewatering screen where the serum was separated from the large size crumb. The serum was recycled to the coagulant supply tank where additional concentrated sulfuric acid was added to the serum to provide a pH of 1.7. The crumb was passed to a wash tank where it was flooded with water and agitated for the purpose of dissolving out any residual acid or soluble salts. The agitated mixture of the washed crumb and wash water was overflowed from the wash tank to a filter of the rotary vacuum drum type where the large particle size coagulum was separated and the wash water discarded. The coagulum was then dried and baled following conventional plant practice.

The resulting coagulum was of a substantially larger particle size than could be produced following prior art procedures where partial coagulation, oil addition, and further coagulation was not practiced. In instances where the oil emulsion feed to the partial coagulation tank was omitted or where the oil emulsion was added to the latex without partial coagulation, i.e., to the head tank only, with all other steps in the process being the same, the resulting crumb was substantially reduced in size.

The above described oil feed to the head tank was omitted and 1.26 gallons per minute of oil emulsion were fed to the partial coagulation trough. All other steps in the process were as described above. The resulting crumb exhibited a substantial increase in particle size over that obtainable when the oil feed to the partially coagulated latex was omitted.

What is claimed is:

1. A method of coagulating rubbery polymer latices comprising the steps of partially irreversibly coagulating rubbery polymer latex with a coagulant, the partially coagulated latex containing visible particles of coagulum, dispersing rubbery polymer processing oil in the partially coagulated latex, and further irreversibly coagulating the partially coagulated latex with a coagulant in the presence of the rubbery polymer processing oil, the rubbery polymer latex being selected from the group consisting of natural rubber latex, polychloroprene latex, latices of homo-polymers of conjugated diolefins, latices of copolymers of conjugated diolefins and monoethylenically unsaturated monomers copolymerizable therewith, and mixtures thereof.

2. The coagulated rubbery polymer product produced by the method of claim 1.

3. The method of claim 1 wherein the rubbery polymer latex is latex of a copolymer of butadiene and styrene.

4. A method of coagulating rubbery polymer latices comprising the steps of partially irreversibly coagulating rubbery polymer latex with a coagulant, the partially coagulated latex containing visible particles of coagulum, adding an emulsion of rubbery polymer processing oil to the partially coagulated latex, and further irreversibly coagulating the partially coagulated latex with a coagulant in the presence of the rubbery polymer processing oil, the rubbery polymer latex being latex of a copolymer of butadiene and styrene.

5. A method of coagulating rubbery polymer latices comprising the steps of mixing rubbery polymer latex with an emulsion of rubbery polymer processing oil, partially irreversibly coagulating the mixture of latex and oil emulsion with a coagulant, the partially coagulated latex containing visible particles of coagulum, adding an emulsion of rubbery polymer processing oil to the partially coagulated latex, and further irreversibly coagulating the partially coagulated latex with a coagulant in the presence of the added rubbery polymer processing oil, the rubbery polymer latex being selected from the group consisting of natural rubber latex, polychloroprene latex, latices of homo-polymers of conjugated diolefins, latices of copolymers of conjugated diolefins and monoethylenically unsaturated monomers copolymerizable therewith, and mixtures thereof.

6. The method of claim 5 wherein the rubbery polymer latex is latex of a copolymer of butadiene and styrene.

7. A method of coagulating rubbery polymer latices comprising the steps of partially irreversibly coagulating rubbery polymer latex by addition of an acidic coagulant to provide a pH of about 4.0–6.5 and thereby irreversibly coagulate about 5–80% by weight of the rubbery polymer originally present in the latex, adding an emulsion of rubbery polymer processing oil to the partially coagulated latex in an amount to provide about 1–100 parts by weight of the oil for each 100 parts by weight of the rubbery polymer, and further irreversibly coagulating the partially coagulated latex with an acidic coagulant in the presence of the rubbery polymer processing oil, the rubbery polymer latex being latex of a copolymer of butadiene and styrene.

8. A method of coagulating rubbery polymer latices comprising the steps of mixing rubbery polymer latex with an emulsion of rubbery polymer processing oil in an amount to provide about 1–50 parts by weight of the oil for each 100 parts by weight of rubbery polymer, partially irreversibly coagulating the mixture of latex and oil emulsion with an acidic coagulant to provide a pH of about 4.0–6.5 and thereby irreversibly coagulate about 5–80% by weight of the rubbery polymer originally present in the latex, adding an emulsion of rubbery polymer processing oil to the partially coagulated latex in an amount to provide about 1–50 parts by weight of the oil for each 100 parts by weight of the rubbery polymer, and further irreversibly coagulating the partially coagulated latex with an acidic coagulant in the presence of the added rubbery polymer processing oil, the rubbery polymer latex being latex of a copolymer of butadiene and styrene.

9. A method of coagulating rubbery polymer latices comprising the steps of partially irreversibly coagulating an intimate mixture of rubbery polymer latex and carbon black with a coagulant, the partially coagulated mixture containing visible particles of coagulum, dispersing rubbery polymer processing oil in the partially coagulated mixture, and further irreversibly coagulating the partially coagulated mixture with a coagulant in the presence of the rubbery polymer processing oil, the rubbery polymer latex being selected from the group consisting of natural rubber latex, polychloroprene latex, latices of homo-polymers of conjugated diolefins, latices of copolymers of conjugated diolefins and monoethylenically unsaturated monomers copolymerizable therewith, and mixtures thereof.

10. The method of claim 9 wherein the rubbery polymer latex is latex of a copolymer of butadiene and styrene.

11. The coagulated copolymer of butadiene and styrene produced by the method of claim 10.

12. A method of coagulating rubbery polymer latices comprising the steps of partially irreversibly coagulating an intimate mixture of rubbery polymer latex and carbon black with a coagulant, the partially coagulated mixture containing visible particles of coagulum, adding an emulsion of rubbery polymer processing oil to the partially coagulated mixture, and further irreversibly coagulating the partially coagulated mixture with a coagulant in the presence of the rubbery polymer processing oil, the rubbery polymer latex being latex of a copolymer of butadiene and styrene.

13. A method of coagulating rubbery polymer latices comprising the steps of partially irreversibly coagulating an intimate mixture of rubbery polymer latex, carbon black and an emulsion of a rubbery polymer processing oil with a coagulant, the partially coagulated mixture containing visible particles of coagulum, adding an emulsion of rubbery polymer processing oil to the partially coagulated mixture, and further irreversibly coagulating the partially coagulated mixture with a coagulant in the presence of the added rubbery polymer processing oil, the rubbery polymer latex being selected from the group consisting of natural rubber latex, polychloroprene latex, latices of homo-polymers of conjugated diolefins, latices of copolymers of conjugated diolefins and monoethylenically unsaturated monomers copolymerizable therewith, and mixtures thereof.

14. The method of claim 13 wherein the rubbery polymer latex is latex of a copolymer of butadiene and styrene.

15. A method of coagulating rubbery polymer latices comprising the steps of partially irreversibly coagulating an intimate mixture of rubbery polymer latex and carbon black by addition of an acidic coagulant to provide a pH of about 4.0–6.5 and thereby irreversibly coagulate about 5–80% by weight of the rubbery polymer originally present in the latex, adding an emulsion of rubbery polymer processing oil to the partially coagulated mixture in an amount to provide about 1–100 parts by weight of the oil for each 100 parts by weight of the rubbery polymer, and further irreversibly coagulating the partially coagulated mixture with an acidic coagulant in the presence of the rubbery polymer processing oil, the rubbery polymer latex being latex of a copolymer of butadiene and styrene.

16. A method of coagulating rubbery polymer latices comprising the steps of partially irreversibly coagulating an intimate mixture of rubbery polymer latex, carbon black slurry and an emulsion of a rubbery polymer processing oil by addition of an acidic coagulant to provide a pH of about 4.0–6.5 and thereby irreversibly coagulate about 5–80% by weight of the rubbery polymer originally present in the mixture, the mixture containing about 1–100 parts by weight of carbon black and 1–50 parts by weight of oil for each 100 parts by weight of rubbery polymer, adding an emulsion of rubbery polymer processing oil to the partially coagulated mixture in an amount to provide about 1–50 parts by weight of the oil for each 100 parts by weight of rubbery polymer, and further coagulating the partially coagulated mixture with an acidic coagulant in the presence of the added rubbery polymer processing oil, the rubbery polymer latex being latex of a copolymer of butadiene and styrene.

17. A method of coagulating rubbery polymer latices comprising the steps of partially irreversibly coagulating rubbery polymer latex with a coagulant, the partially coagulated latex containing visible particles of coagulum, dispersing a tackifying agent in the partially coagulated latex selected from the group consisting of rubbery polymer processing oil, rosin oil, disproportionated rosin acids, N-wood rosin, liquid low molecular weight polybutadiene, N,N'-dioctylparaphenylene diamine, the reaction product at elevated temperature of diphenylamine and acetone, pine tar oil, naphthenic acid and mineral rubber, and further irreversibly coagulating the partially coagulated latex with a coagulant, the rubbery polymer latex being selected from the group consisting of natural rubber latex, polychloroprene latex, latices of homo-polymers of conjugated diolefins, latices of copolymers of conjugated diolefins and ethylenically unsaturated monomers, and mixtures thereof.

18. The method of claim 17 wherein the rubbery polymer latex is latex of a copolymer of butadiene and styrene.

19. A method of coagulating rubbery polymer latices comprising the steps of dispersing in rubbery polymer latex a material selected from the group consisting of carbon black, lignin, calcium silicate, clay, silica, zinc oxide, calcium carbonate and magnesium carbonate, partially irreversibly coagulating the latex containing said dispersed material with a coagulant, the partially coagulated latex containing visible particles of coagulum, dispersing in the partially coagulated latex a tackifying agent for rubbery polymers selected from the group consisting of rubbery polymer processing oil, rosin oil, disproportionated rosin acids, N-wood rosin, liquid low molecular weight polybutadiene, N,N'-dioctyl paraphenylene diamine, the reaction product at elevated temperature of diphenylamine and acetone, pine tar oil, naphthenic acid and mineral rubber, and further irreversibly coagulating the latex with a coagulant, the rubbery polymer latex being selected from the group consisting of natural rubber latex, polychloroprene latex, latices of homopolymers of conjugated diolefins, latices of copolymers of conjugated diolefins and monoethylenically unsaturated monomers copolymerizable therewith, and mixtures thereof.

20. The method of claim 19 wherein the rubbery polymer latex is latex of a copolymer of butadiene and styrene.

References Cited in the file of this patent

UNITED STATES PATENTS

| 2,527,525 | Breuer | Oct. 31, 1950 |
| 2,576,909 | Adams | Dec. 4, 1951 |
| 2,769,795 | Braendle | Nov. 6, 1956 |

OTHER REFERENCES

Whitby: "Synthetic Rubber," John Wiley & Sons, Inc., New York (1954), pages 201 and 202.

Rubber Age and Synthetics, volume 32, No. 6, August 1951, page 198 relied on.